United States Patent Office 3,205,135
Patented Sept. 7, 1965

3,205,135
COMBINING PENICILLINASE-SENSITIVE PENICILLINS WITH FUSIDIC ACID FOR USE AGAINST PENICILLINASE-PRODUCING BACTERIA
Leif Tybring, Copenhagen, Denmark, assignor to Løvens Kemiske Fabrik Ved A. Kongsted, Ballerup, Denmark, a firm
No Drawing. Filed July 3, 1962, Ser. No. 207,432
Claims priority, application Great Britain, July 5, 1961, 24,328/61
1 Claim. (Cl. 167—65)

This invention concerns a therapeutic composition adapted for treatment of infectious diseases, and dosage units thereof.

More specifically the invention concerns an anti-bacterial composition containing as the therapeutically active material fusidic acid or one of its salts and a derivative of 6-aminopenicillanic acid.

Fusidic acid is a known compound, formerly designated Antibiotic ZN–6, which according to previous publications can be obtained by growing the fungus *Fusidium coccineum* Fuck (K. Tubaki) in an adequate fermentation medium.

The said compound is an $\alpha,\beta$-unsaturated carboxylic acid of the elementary formula $C_{31}H_{48}O_6$ the molecular structure of which is believed to be:

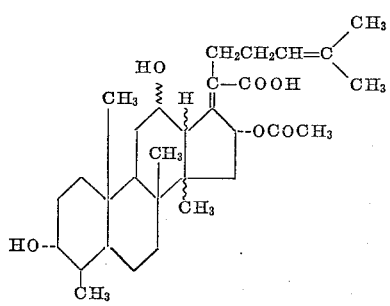

In the above formula, the wavered connecting lines indicate that the configuration in question is uncertain and the dotted lines that the radical in question is in the $\alpha$-position.

It appears from the formula that fusidic acid is a cyclopentenopolyhydrophenanthrene derivative.

Fusidic acid itself is sparingly soluble in water. It is, however, a weak acid having a pKa in the neighbourhood of 5.3 and is capable of forming a variety of salts with inorganic or organic bases, many of which salts may be used for therapeutic purposes.

According to bacteriological and clinical tests, the substance has proved effective against a number of pathogenic micro-organisms, for instance *Staphylococcus aureus*, *Neisseria gonorrhoeae* and their penicillin-resistant strains, *Neisseria meningitidis*, *Mycobacterium tuberculosis* and the streptomycin, -isonicotinic acid hydrazide or p-amino-salicylic acid-resistant strains of the same organism, and *Corynebacterium diphtheriae*.

The present invention particularly embraces the discovery that by combining fusidic acid with a suitable penicillin a composition is produced which in certain cases is considerably more effective in augmented antibacterial activity produced than either constituent alone when used in corresponding amounts.

The greater activity than that to be expected by assuming that the activities of the ingredients would be truly additive has been demonstrated in a bacteriological investigation in which a penicillinase-producing strain of *Staphylococcus aureous* was used.

In the said investigation the activity of the composition in question was determined as the amount of the composition which caused 50 percent inhibition of the growth of the organism when incubated at 37° C. for 20 hours.

The composition consisted of penicillin V and fusidic acid, and in Table 1 below the figures in column A indicate the ratio of fusidic acid to penicillin V expressed in percentage, while the figures in column B indicate the activity observed in relation to the hypothetical activity calculated on the assumption that the activities of the ingredients were additive.

TABLE 1

| A (percent): | B |
|---|---|
| 0.0 (pure penicillin V) | 1.0 |
| 0.07 | 1.45 |
| 0.20 | 4.20 |
| 3.30 | 4.50 |
| 6.0 | 2.80 |
| 100 (pure fusidic acid) | 1.00 |

The synergism observed has been further verified in animal experiments in which the number of surviving test animals in the group treated with the composition indicated a similarly favourable activity of the composition.

It should be mentioned, however, that, in animal experiments or clinical trials, the ratio of fusidic acid to the penicillin compound in question may differ widely from the ratio mentioned in the above table, the absorption rate and distribution in the body liquids of the antibiotic components contained in the composition being factors of great importance to the choice of the most favourable ratio between the active ingredients. In order to obtain the said synergistic effect in vivo it has consequently proved advantageous to use compartively larger quantities of fusidic acid in proportion to penicillin than stated in the above-mentioned bacteriological investigation.

By way of example it may be mentioned that in an animal experiment in which the test animals were mice which had been intravenously infected with 0.2 ml. of a 17-hour culture, diluted 10 times, of a penicillinase-producing strain of *Staphylococcus aureus*, an advantageous ratio was found to be: 3 parts of pencillin V calcium to one of the sodium salt of fusidic acid.

In the said experiment the test animals were given 7 single doses orally, distributed over 84 hours in the following way: one dose on the day when the infection took place, and 2 doses over each of the subsequent 3 days. The results of the experiment appear from the below table in which the effect is expressed in the average time of survival for the group of test animals (10 animals per group of infection and treatment; 20 animals per group of control).

TABLE 2

| | Time of survival |
|---|---|
| Control | 3.5 |
| 2 mg. of the calcium salt of pencillin V per dose | 11.0 |
| 6 mg. of sodium salt of fusidic acid per dose | 12.0 |
| 2 mg. of the calcium salt of pencillin V and 6 mg. of sodium salt of fusidic acid per dose | 31.0 |

The synergism described above is, however, conditional on the present composition containing a penicillin which is sensitive to the influence of penicillinase, and on the composition being used in the treatment of an infection caused by penicillinase-producing micro-organisms.

Thus, the invention particularly concerns a therapeutic composition adapted for treatment of infectious diseases caused by penicillinase-producing micro-organisms, and containing as the active components fusidic acid and a penicillinase-sensitive penicillin, if necessary mixed with a pharmaceutical carrier, in which composition the ratio of fusidic acid to the penicillin in question may be from 5 to 95 percent.

In the composition of the invention the penicillins may be used as their known water-insoluble or water-soluble salts, or even some of the free penicillin acids may be used as such, for instance the penicillin V acid.

The usable salts of fusidic acid for the preparation of the composition include the water-soluble sodium, potassium, ammonium, triethylamine, piperidine, morpholine, cyclohexylamine, and mono- and diethanol amine salts, and the slightly water-soluble calcium, magnesium, dibenzyl-ethylenediamine, benzyl - $\beta$ - phenylethylamine, and procaine salts. Among the salts preferred mention may be made of the sodium and diethanol amine salts. Further, fusidic acid itself can be one of the ingredients of the composition.

The mixture of the active components can furthermore be mixed with any of the known solid or liquid pharmaceutical carriers and auxiliary compounds which will not react with the antibiotic substances, in order to obtain compositions which are usable for enteral, parenteral, or local administration.

The composition produced can either be worked up to pharmaceutical forms of presentation such as tablets, pills, dragees, or suppositories, or the composition can be filled into medical containers such as capsules or ampoules or, as far as mixtures or ointments are concerned, they may be filled into bottles, tubes, or similar containers.

As fusidic acid is preferably administered orally it may be conveniently combined with one of the penicillins preferred for oral administration, i.e. with one of the acid-resistant penicillins.

Of such acid-resistant penicillins mention may be made of $\alpha$-aminobenzyl-penicillin, phenoxymethyl-penicillin, or derivatives of the latter, such as $\alpha$-phenoxyethyl-penicillin, $\alpha$-phenoxypropyl-penicillin, or p-chloro-phenoxymethyl-penicillin, but also other derivatives of 6-aminopenicillanic acid may be used in the composition according to the invention, the latter not being limited by the above list of compounds.

Another object of the invention consists in the selection of a dosage unit which may be advantageously employed in the treatment of infectious diseases caused by penicillinase-producing micro-organisms.

By the term "dosage unit" is meant a unitary, i.e. a single dose capable of being administered to the patients which may be readily handled and packed, remaining as a physically stable unit dose containing either the active material as such, or the active material mixed with solid or liquid diluents or carriers.

If the composition is to be injected a dosage unit is provided including a sealed ampoule, a vial, or a similar container containing a parenterally acceptable, aqueous or oily, injectable solution or dispersion of the active material.

A suitable treatment of patients is the administration of 2 to 4 dosage units each containing at least 50 mg. and not more than 400 mg. of the penicillin in question, or a non-toxic salt thereof, and at least 50 mg. and not more than 400 mg. of fusidic acid itself or one of its non-toxic salts, associated with pharmaceutical carriers the amount of which does not commonly exceed 250 mg.

However, the adequate daily dose of the composition depends on the condition of the patient and the character of the infectious disease for which reason the frequency of administration may vary to some extent.

In a preferred embodiment of the invention the dosage unit contains from 100 to 300 mg. of the penicillin in question, preferably in the form of a salt, and from 100 to 300 mg. of fusidic acid or one of its salts.

The preferred pharmaceutical form of presentation of dosage units is capsules, pills, or tablets, and in particular enteric-coated tablets, e.g. tablets the coating of which being of such a nature that the contents of the tablets are only liberated in the intestinal canal.

In a particularly appropriate embodiment of the invention the dosage unit is in the form of tablets or pills, the inner core of which contains one of the antibiotically active components, for instance the sodium salt of fusidic acid, associated with the necessary pharmaceutical auxiliary agents, whereas the outer core contains the other antibiotically active component, for instance the penicillin in question or its salt, associated with adequate auxiliary agents.

The said form is particularly advantageous if salts of fusidic acid with strong bases are employed, for instance the sodium salt, as the said salts have alkaline properties and consequently have a detrimental influence on the stability of the penicillin in the mixture.

In another appropriate embodiment of the invention double tablets are provided the halves of which contain their respective component under conditions which have no influence on either of the components in question.

On the other hand, if a salt of fusidic acid with a weak base, as for instance the diethanol amine salt, forms part of the dosage unit a mixture of the said salt and the penicillin in question associated with adequate carriers and auxiliary agents can advantageously be compressed into tablets in the conventional manner.

The dosage unit of the invention may furthermore contain other components which may contribute to increasing the scope of utility of the composition contained in the dosage unit in question, e.g. antibacterially active sulfonamides or nitro-furan derivatives, antibiotics which are not absorbable by the intestinal canal, or sulfamylbenzoic acid derivatives which are capable of delaying the excretion of the penicillin administered.

The invention will now be illustrated by the following examples.

*Example 1*

Capsules, each containing 0.125 g. of the sodium salt of fusidic acid and 0.125 g. of the crystalline calcium salt of penicillin V, are prepared according to the following procedure.

| Ingredients: | G. |
|---|---|
| Sodium salt of fusidic acid | 125 |
| Calcium salt of penicillin V | 125 |
| Lactose | 27 |
| Magnesium stearate | 3 |

The ingredients are passed through a 60-mesh sieve and mixed for 15 minutes. The mixture is filled into No. 00 gelatine capsules (Parke, Davis and Co.), using a semi-automatic capsule-filling machine shaken by vibrator. Each capsule contains 280 mg. of the mixture corresponding to 125 mg. of the sodium salt of fusidic acid and 125 mg. of the calcium salt of penicillin V.

*Example 2*

Capsules each containing:

| p-Chloro-phenoxymethylpenicillin | units | 200,000 |
|---|---|---|
| Diethanol amine salt of fusidic acid | mg | 192 |

145 g. of potassium-p-chloro-phenoxymethylpenicillin is thoroughly mixed in a blender with 192 g. of the diethanol amine salt of fusidic acid and 3 g. of magnesium stearate. After passing a 20-mesh sieve the powder is filled into gelatine capsules No. 00.

*Example 3*

Double-layer tablets containing in two separate layers:

| $\alpha$-Phenoxyethylpenicillin | units | 200,000 |
|---|---|---|
| Sodium salt of fusidic acid | mg | 167 |

LAYER NO. 1

1350 g. of potassium $\alpha$-phenoxyethylpenicillin and 970 g. of lactose is mixed and moistened with 1150 g. of a suspension of micro-fine amorphous silica in carbon tetrachloride. The mixture is passed through an 18-mesh sieve, dried, and mixed with 30 g. of magnesium stearate.

LAYER NO. 2

1670 g. of the sodium salt of fusidic acid is mixed with 800 g. of starch and moistened with 1800 g. of carbon tetrachloride and absolute alcohol (9:1), passed through an 18-mesh sieve, dried, and mixed with 30 g. of magnesium stearate.

The two granules are compressed in a double-layer rotary press using 12 mm. punches. The above formulation is based on 10,000 tablets.

Example 4

Coated tablets each containing:

| | | |
|---|---|---|
| a-Aminobenzylpenicillin | units | 100,000 |
| Diethanol amine salt of fusidic acid | mg | 192 |

CORE 65 g. of potassium α-aminobenzylpenicillin is mixed thoroughly with 192 g. of the sodium salt of fusidic acid and 80 g. of lactose. The mixture is shifted through a 30-mesh sieve and moistened with a solution of 4 g. acetylated monoglyceride in carbon tetrachloride, then granulated by passing through a sieve No. 18, dried, and mixed with 5 g. of sodium alginate and 4 g. of magnesium stearate.

The well-mixed material is compressed into tablets by deep concave punches of 10 mm. diameter being used.

COATING

The cores are transferred to an ordinary coating pan, and a few layers of a sub-coating of acetylated monoglyceride is applied from a 5% solution in carbon tetrachloride.

The tablets are dried in an air blast, and finally, a sugar coating is applied in the conventional manner.

Example 5

Enteric-coated tablets each containing:

| | | |
|---|---|---|
| Procaine penicillin G | units | 150,000 |
| Diethanol amine salt of fusidic acid | mg | 192 |

CORE 150 g. of powdered procaine penicillin G is mixed with 100 g. of lactose and granulated with a previously prepared and cooled 4% solution of gelatine in distilled water by means of an 18-mesh sieve. The granules are allowed to dry at a temperature of approx. 30° C. 192 g. of the diethanol amine salt of fusidic acid is moistened with 90 g. of chloroform, passed through an 18-mesh sieve, and allowed to dry at room temperature.

The dried granules are mixed with the granules of procaine penicillin G, and 40 g. of talc and 8 g. of calcium-ammonium alginate is admixed. The mixture is sifted through an 18-mesh sieve and pressed into tablets by a deep concave punch of 12 mm. diameter being used.

ENTERIC-COATING

A coating solution is made from the following ingredients:

| | Parts |
|---|---|
| Cellulose acetate phthalate | 10 |
| Diethyl phthalate | 2 |
| Acetone | 88 |

This solution is applied in small portions to the tablets. Between each application the tablets are allowed to dry thoroughly in an air blast. Application of coating solution is continued until a sample meets the requirement in the U.S.P. XV of enteric-coated tablets as regards time of disintegration.

What I claim and desire to secure by Letters Patent having thus described my invention, is:

A method of producing augmented anti-bacterial activity against pencillinase-producing bacteria, including penicillinase-producing strains of *Staphylococcus aureus* which are resistant to penicillin which comprises simultaneously contacting said bacteria with at least one member selected from a first group consisting of fusidic acid and its atoxic salts with pharmaceutically acceptable bases, and at least one member selected from a second group consisting of penicillin G, pencillin V, α-phenoxyethylpenicillin, α-phenoxypropylpenicillin, p-chlorophenoxymethylpencillin and α-aminobenzylpenicillin and its atoxic salts until more anti-bacterial activity against said bacteria is demonstrable than the corresponding anti-bacterial activity obtainable from either of said constituent members when used alone in corresponding amounts.

References Cited by the Examiner

UNITED STATES PATENTS

| | | | |
|---|---|---|---|
| 2,974,136 | 3/61 | Nielsen | 260—239.1 |
| 2,991,226 | 7/61 | Millar et al. | 167—82 |
| 3,007,920 | 11/61 | Vanderhaughe et al. | 260—239.1 |
| 3,018,221 | 1/62 | Millar et al. | 167—65 |
| 3,049,474 | 8/62 | Hepworth | 167—65 |
| 3,072,531 | 1/63 | Godtfredsen et al. | 167—65 |

OTHER REFERENCES

Abraham et al.: "New Penicillins, Cephalosporin C, and Penicillinase," Endeavour 20, pp. 92–100, April 1961.

Batchelor et al.: "6-Aminopenicillanic Acid as a Substrate for Penicillinase and an Inducer of Penicillinase Formation," Proc. Roy. Soc. Biol. 154, 514–21, Aug. 15, 1961.

Crawford et al.: "The Synergistic Action of Cephalosporin and Benzylpenicillin Against a Penicillinase-Producing Strain of *Staphylococcus aureus*," J. Gen. Microb. 16 (3), pp. 604–613, June 1957.

Crompton et al.: "Behaviour of Some Derivatives of 7-Aminocephalosporanic Acid and 6-Aminopenicillanic Acid as Substrates, Inhibitors, and Inducers of Penicillinases," Biochem. J. 83, pp. 52–63, April 1962.

Moat et al.: "Effect of Cephalosporin C and Various Penicillin Derivatives on Staphylococcal Penicillinase and Penicillinase-Producing Staphylococci," Proc. Soc. Exp. Biol. Med. 106, pp. 78–85, January 1961.

Novick: "Staphylococcal Penicillinase and the New Penicillins," Biochem. J. 83, pp. 229–35, May 1962.

Wallmark et al.: "Comparative Activity of Various Penicillins Against Penicillinase-Producing and Non-Penicillinase-Producing Staphylococci," Proc. Soc. Exp. Biol. Med. 106, pp. 77–85, January 1961.

LEWIS GOTTS, *Primary Examiner.*

JULIAN S. LEVITT, *Examiner.*